United States Patent [19]
Suter

[11] 3,801,402
[45] Apr. 2, 1974

[54] METHOD OF PREPARING A COMPOSITE STRUCTURE
[75] Inventor: Charles A. Suter, Cuyahoga Falls, Ohio
[73] Assignee: The Goodyear Tire & Rubber Company, Akron, Ohio
[22] Filed: Oct. 20, 1971
[21] Appl. No.: 191,129

Related U.S. Application Data
[63] Continuation of Ser. No. 41,072, May 27, 1970, abandoned, which is a continuation of Ser. No. 717,581, April 1, 1968, abandoned.

[52] U.S. Cl. .................. 156/182, 264/92, 264/96
[51] Int. Cl. ..................... B29c 17/04, B32b 1/10
[58] Field of Search ............. 264/89, 90, 92, 93, 94, 264/96, 248; 156/87, 156, 182, 196, 221, 224, 285, 292, 304, 306, 222, 309; 425/109, 388

[56] References Cited
UNITED STATES PATENTS
2,081,777   5/1937   Talalay ............................... 264/90
2,253,291   8/1941   Fraknoi ............................ 264/96 X
2,670,501   3/1954   Michiels ............................. 264/90
2,873,227   2/1959   Olson et al. ...................... 264/92 X FOREIGN PATENTS OR APPLICATIONS
235,321     6/1925   Great Britain ..................... 264/96
1,166,452   3/1964   Germany ............................ 264/92

Primary Examiner—Robert F. White
Assistant Examiner—J. H. Silbaugh
Attorney, Agent, or Firm—F. W. Brunner; H. C. Young, Jr.

[57] ABSTRACT

A method of forming a container for holding liquid hydrocarbons. First and second curable polymeric flexible sheets are shaped by reduced fluid pressure against respective concave molds and the sheets, before or after the shaping thereof, are adhesively adhered together through a strip of curable rubber interposed between the sheets of their peripheries. Where the sheets are adhered together prior to forming one of the sheets, a vent is provided through the shaped sheet to the outside air. The shaped and adhered sheets are cured while the reduced pressure and venting are maintained.

8 Claims, 7 Drawing Figures

PATENTED APR 2 1974

INVENTOR.
CHARLES A. SUTER

BY Henry C. Young Jr.

ATTORNEY

INVENTOR.
CHARLES A. SUTER
BY Henry C. Young Jr.
ATTORNEY

METHOD OF PREPARING A COMPOSITE STRUCTURE

This is a continuation of application Ser. No. 41,072 filed May 27, 1970, now abandoned, which is a streamline continuation of application Ser. No. 717,581 filed Apr. 1, 1968, now abandoned.

This invention relates to a method of preparing a composite structure suitable for containing liquids.

Containers having flexible walls suitable for containing liquids and particularly for containing liquid hydrocarbons such as automobile gasoline tanks can be prepared by building the flexible structure around a building form and then removing the building form through a hole in the formed flexible structure. Also, the structures can be prepared by forming halves of a container inside of concave mold, removing the halves from the mold and then cementing or bonding the halves together. All of these methods present inherent commercial production difficulties and new methods of preparing such containers are sought.

Therefore it is an object of this invention to provide a novel and improved method of preparing composite structures for containing liquid hydrocarbons.

According to this invention, a method of preparing a composite structure having a hydrocarbon barrier layer as an innerliner suitable for containing liquid hydrocarbons comprises (a) shaping a first flexible sheet against a mold member and shaping a second flexible sheet against a mold member by applying a pressure differential between an outer surface of a flexible sheet and a mold member to actuate the sheet inwardly toward the mold member and (b) adhering the first flexible sheet to the second flexible sheet to define an enclosed cavity having a venting means between the sheets prior to the said shaping of the sheets or after shaping one of the sheets, wherein the surfaces of the said flexible sheets facing each other have hydrocarbon barrier layers adhered thereto and (c) curing the sheets to form the composite structure. It is understood that the composite structure can also be prepared without the hydrocarbon barrier by the method of this invention.

The objects and further advantages of this invention will be apparent in view of the following detailed description and drawings.

Figure 1:
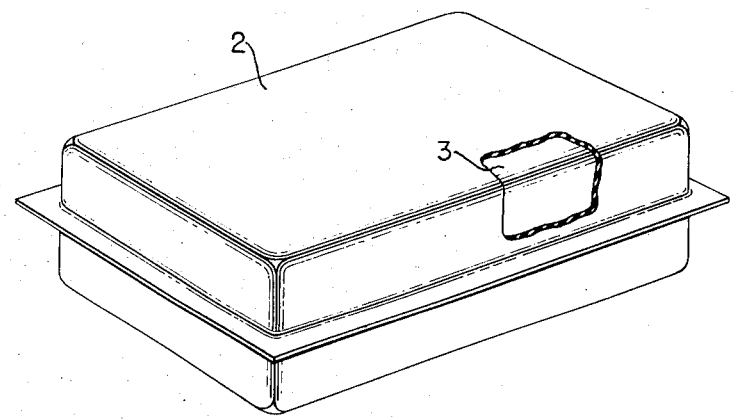
FIG. 1 is a perspective view of a container of the pinched seam type for liquid hydrocarbons having a hydrocarbon barrier layer as an innerliner, shown more clearly by the cutaway portion.
Figure 2:
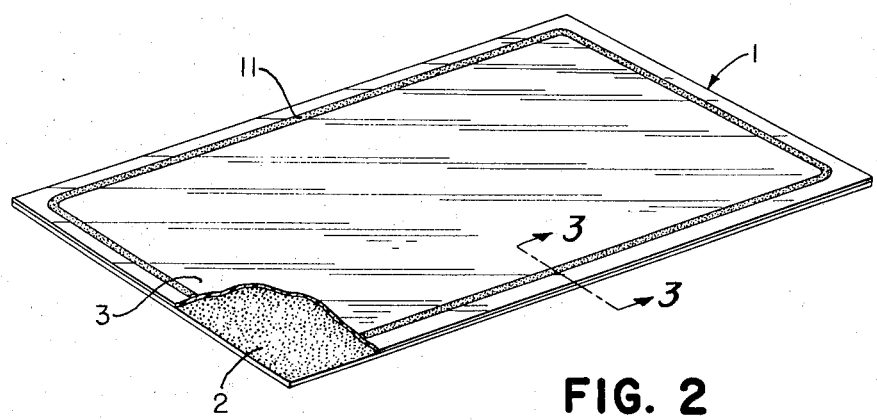
FIG. 2 is a perspective view of a flexible sheet used to prepare the container for liquid hydrocarbons having a hydrocarbon barrier layer adhered thereto and having a layer of bonding cement applied to the extremities of the sheet on the side having the hydrocarbon barrier shown more clearly by the cutaway portion.
Figure 3:
FIG. 3 is an enlarged cross-sectional view along line 3—3 of FIG. 2.

Referring to the figures, a first flexible sheet 1 is provided comprising a flexible polymeric material 2 such as natural rubber, synthetic rubber, or a polyurethane and preferably a hydrocarbon resistant polymeric material such as a butadiene-acrylonitrile copolymer, and a layer of hydrocarbon barrier material 3 adhered thereto such as nylon, polyvinylidene chloride, and polyester types.

A first concave mold 4 is provided having venting tubes 5 attached and connected to a vacuum or reduced pressure source such as a vacuum pump. On the inside surface of the mold are positioned small fibrous pads 6 such as a textile fabric over the openings of the venting tubes 5 to distribute the gas flow and thereby prevent the opening of a vent tube from becoming closed.

The first flexible sheet 1 is releasably attached to the aperture of the first concave mold 4 with clamps 7 to form an enclosed cavity 8 between the first sheet and the first mold with the liquid hydrocarbon barrier layer 3 adhered to the outer surface of the first flexible sheet 1.

A reduced pressure is then applied to the enclosed cavity 8 by applying a vacuum through the vent tubes 5 to actuate the flexible sheet 1 inwardly toward the surface of the first concave mold 4 and thereby form the first sheet in a concave position 9. The fibrous pads 6 in the concave mold covering the openings of the vent tubes 5 prevent the said openings from becoming closed by the flexible sheet. It is preferred that the surface of the first sheet 1 contacts the surface of the first mold 4 and is molded thereby.

A vent tube 10 is injected through the first mold surface and first shaped flexible sheet and preferably positioned with a sealant around the vent so that any reduced pressure between the first mold surface and sheet is not substantially affected thereby. A coating of curable cement 11 such as a rubber, epoxy, or phenolic type of bonding cement is applied around the periphery of the aperture of the concave first sheet on the surface of the hydrocarbon barrier layer.

A second flexible sheet 12 is adhered to the first sheet with the cement coating 11 to define a cavity 13 between the first and second sheets essentially enclosed by the hydrocarbon barrier layers of the sheets and vented with the vent tube 10. If desired, a narrow strip of curable flexible polymeric material can be positioned over the cement coating on the first flexible sheet followed by coating the strip of polymeric material with a second coat of bonding cement and adhering the second flexible sheet to the second bonding cement coat to facilitate increasing the bond between the two flexible sheets. Thus, the first and second sheets are positioned so that their surfaces facing each other have the hydrocarbon barrier layers adhered thereto. Therefore, the bonding cement was actually coated onto the hydrocarbon barrier layer portions of the flexible sheets.

A second concave mold 14 is releasably attached with clamps 15 to the second sheet to form an enclosed cavity between the second sheet and second mold. The second mold is fitted with vents 16 to a vacuum or reduced pressure source such as a vacuum pump. A reduced pressure is applied to the cavity between the second sheet and second mold by attaching the vents 16 to the vacuum source to actuate the second sheet inwardly toward the second mold to shape the second sheet in a concave position. The vent tube 10 provides an air source to allow air to enter the cavity between the sheets, thereby facilitating the inward actuation of the second sheet and maintaining a pressure differential between the second mold surface and the outside surface which is the surface having the hydrocarbon layer adhered thereto, of the second flexible sheet.

In this position, the mold is placed in a forced air oven and the flexible sheets and curable cement are cured following which the mold is removed from the oven and the prepared container removed from the mold.

In the description of the drawings, the flexible sheets were shaped by applying a vacuum or reduced pressure to the cavity between a sheet and a mold member. As an alternative method, the sheets can be shaped by applying a positive pressure to the cavity between the sheets through the vent 10 and allowing gas such as air to escape from the cavities between the sheets and molds 8 and 13 through the vents 5 and 16, in the instance where the sheets are adhered together prior to their shaping, to force or actuate the sheets outwardly to the mold surfaces by the resultant pressure differential between an outer surface of a sheet having a hydrocarbon barrier adhered thereto and a mold surface.

As a further alternative, one sheet can be shaped and cured prior to shaping and curing the second sheet.

Various methods can be used for adhering the two sheets together. Representative examples of such methods are heat sealing the hydrocarbon barrier layers, and the application of various adhesives and bonding cements to their surfaces.

The composite structure of this invention having a hydrocarbon barrier can be used to contain various hydrocarbons and their mixtures exemplary of which are petroleum and coal tar distillates and various fuels such as gasoline and kerosene and various lubricating and fuel oils having boiling points at atmospheric pressure ranging from about −10°C. to about 400°C. and usually from about 0°C. to about 150°C. Suitable hydrocarbons are saturated aliphatic, saturated cycloaliphatic, unsaturated aliphatic, unsaturated cycloaliphatic, and aromatic hydrocarbons and mixtures of such hydrocarbons. Representative examples of these and other various saturated hydrocarbons are aliphatic hydrocarbons such as the butanes, the pentanes, the hexanes, the heptanes, the octanes and the nonanes; aromatic hydrocarbons such as benzene, toluene and xylene; saturated cycloaliphatic hydrocarbons such as cyclohexane; and various unsaturated hydrocarbons representative of which are olefins such as the butenes, the pentenes, the hexenes, the heptenes, the octenes, and the nonenes; and diolefins such as the butadienes, the pentadienes, isoprene, the hexadienes, the heptadienes, and the octadienes. Various mixtures of unsaturated, saturated and aromatic hydrocarbons can also be contained.

In the practice of this invention, the flexible sheets used to prepare the composite structure comprise at least one layer of a flexible polymeric material having at least one layer of a hydrocarbon barrier material adhered thereto. Various flexible polymeric materials can be used, representative examples of which are curable flexible materials such as natural rubber and the various synthetic rubbers. Representative of various synthetic rubbers are rubbery polymers of conjugated dienes such as 1,4 addition polymers of 1,3-butadiene and 1,4 addition polymers of isoprene, the rubbery copolymers of butadiene and styrene which contain a major proportion of butadiene, particularly copolymers of butadiene and styrene of the hot and cold SBR type which contain from 60 to about 90 percent by weight of butadiene; rubbery copolymers of butadiene and acrylonitrile; butyl rubber, which is a polymerization product of a major proportion of a mono olefin, such as butylene, and a minor portion of multi-olefin, such as butadiene and isoprene; copolymers of ethylene and propylene; and terpolymers of ethylene, propylene and a minor proportion of a nonconjugated diene and flexible polymers formed by the open ring polymerization of unsaturated alicyclic compounds having from one through three carbon-to-carbon double bonds in the alicyclic ring such as polyoctenamers and polydodecenamers. It is desirable to use a rubbery copolymer of 1,3-butadiene and acrylonitrile such as the type prepared by emulsion polymerization and it is particularly desirable to use such a rubbery copolymer in admixture with from about 10 to about 60 parts of polyvinyl chloride per 100 parts of copolymer. It is understood that such polymers are compounded with various curing agents such as sulfur and peroxides, and with accelerators, antioxidants, fillers, plasticizers, pigments and carbon black.

The hydrocarbon barrier materials for the flexible sheets can be adhered to the flexible sheets by various methods well known to those skilled in the art such as coating a flexible sheet with a solution of the barrier material or by adhering a film of the barrier material to the flexible sheet with an adhesive or bonding cement. A curable rubber, epoxy, or phenolic cement, for example, can be used. If the hydrocarbon barrier material is applied as a solution, usually the solution contains from about 1 to about 70 parts by weight of the barrier material per 100 parts by weight of solvent. Dilute solutions of from about 3 to about 20 parts by weight of the barrier material per 100 parts of the solvent are usually preferred where the solutions are to be applied by ordinary methods such as by brushing and by spraying. It is to be appreciated that if the viscosity of the solutions are high the higher concentrations are usually workable only with difficulty and special procedures must be applied such as the use of higher temperatures and pressures above atmospheric.

Usually the layer of hydrocarbon barrier material on the flexible sheet has a thickness of from about 0.25 mils to about 10 mils or thicker although it is usually preferred that the layer has a thickness of from about 0.5 mils to about 5 mils.

Various materials can be used as hydrocarbon barrier materials representative of which are nylon, polyvinylidene chloride, copolymers of vinylidene chloride, vinyl chloride, and acrylonitrile, and certain linear polyesters derived from dicarboxylic acids and straight chain glycols.

Representative barrier materials as copolymers prepared from vinylidene chloride, vinyl chloride, and acrylonitrile are the polymers comprising from about 50 to about 100 mol percent units derived from vinylidene chloride, from about 0 to about 50 mol percent units derived from vinyl chloride and from 0 to 50 mol percent units derived from acrylonitrile. It is usually preferable that the polymer comprises from about 65 to about 85 mol percent units derived from vinylidene chloride from about 15 to about 35 mol percent units derived from vinyl chloride, and from 15 to about 35 mol percent units derived from acrylonitrile. A particularly desirable hydrocarbon barrier coat comprises a copolymer of vinylidene chloride and acrylonitrile. The properties of these polymers vary widely depending upon the monomers used, the ratio of monomers used, polymerization conditions, and the degree of polymerization. For example, their tensile strengths at ultimate elongation can range from about 1,500 to about 40,000 pounds per square inch, their ultimate elongations can range from about 0 to about 350 percent, their specific gravities can range from about 1.5 to about 1.75, and their refractive indices can refractive indices can range from about 1.5 to about 1.65. The polymers are usually characterized by being generally soluble in cyclic ethers and ketones and generally insoluble in chlorinated hydrocarbons, aliphatic hydrocarbons, aromatic hydrocarbons, and alcohols.

If these polymers are applied to the flexible sheet as a solution, the polymer is usually dissolved or dispersed in various solvents representative of which are ketones and their mixtures which are liquid at about 20°C. Representative ketones are acetone and methyl ethyl ketone. Various other liquids can be used as diluents in conjunction with such solvents which themselves are not good solvents for the said copolymer, such as toluene and various alcohols to improve the spraying or drying properties of the copolymers. Representative alcohols are methyl alcohol, ethyl alcohol, isopropyl alcohol, normal propyl alcohol, isobutyl alcohol, normal butyl alcohol, the amyl alcohols, the hexyl alcohols and the heptyl alcohols.

Representative examples of barrier materials of a suitable polymeric linear ester comprises a polymeric polyester of substantially the structure derived from the reaction of at least one dicarboxylic acid selected from the group consisting of terephthalic acid and isophthalic acid with -decane least one straight chain glycol of the series $HO(CH_2)_nOH$, where "$n$" is an integer from 2 to 10 inclusive, and where the ratio of units of the polymer derived from terephthalic acid to the units derived from isophthalic acid is from about 20:80 to 100:0. Representative of suitable straight chain glycols are ethylene glycol, propylene glycol, 1,4-butane diol, 1,5-pentane diol, 1,6-hexane diol, 1,7-heptane diol, 1,8-octane diol, 1,9-nonane diol and 1,10-decene diol. Usually ethylene glycol, propylene glycol and 1,4-butane diol are preferred. The generally preferred polymeric polyesters are polyethylene terephthalate and those having a ratio of terephthalic acid to isophthalic acid units of from about 50:50 to about 90:10. Suitable methods of preparing such polymers are shown in U.S. Pat. No. 2,965,613. It is also usually desired that the polymeric polyesters used as the hydrocarbon barrier materials of this have an intrinsic viscosity of from about 0.4 to about 0.8 and preferably from about 0.5 to about 0.7 For the purposes of this invention, when a polyethylene terephthalate film is used, it is generally preferred that it is an oriented, heat-set film which has been stretched to substantially the same extent in both directions and heat-set at a temperature of from about 150°C. to about 200°C. under tension by methods known to those skilled in the art.

The term "intrinsic viscosity" as used in this specification can be defined as:

specific viscosity + 3 ln (relative viscosity)/4$c$ where the relative viscosity is defined as:

(solution flow time)/(solvent flow time), the specific viscosity is defined as:

(relative viscosity − 1);

and $c$ is the concentration of the solution expressed as grams of polymer per 100 milliliters of solution. The intrinsic viscosity measurements are made at 30°C. with a solvent prepared by mixing phenol and symmetrical tetrachloroethylene in a weight ratio of 60:40. Usually a solution concentration of about 0.5 grams of polymer per 100 milliliters of solvent is used.

The nylons when used as the hydrocarbon barrier layer can be applied to the flexible sheets as films and as solutions. Representative of the various nylons are the well-known polyamides referred to as nylons which comprise the reaction product of a linear polymer-forming composition containing amide-forming groups, for example, one consisting essentially of bifunctional molecules each containing two reactive groups which are complementary to reactive groups in other molecules and which comprise complementary amide-forming groups. These polyamides as described above, or as otherwise identified hereinafter, can be obtained, for example, by self-polymerization of a monoaminomonocarboxylic acid or caprolatum by reacting a diamine with a dibasic carboxylic acid in substantially equimolecular amounts, or by reacting a monoaminomonohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants. The preferred polyamides are those having a unit length of at least seven. A further description of the nylons is found in U.S. Pat. Nos. 2,071,250, 2,071,253, 2,130,948 and 2,393,972.

The composite structure prepared by the method of this invention has utility as a container for liquid hydrocarbons and it can be particularly useful as a gasoline tank for vehicles such as automobiles.

The following illustrative example is set forth to further exemplify the objects and advantages of this invention. The parts and percentages are by weight unless otherwise indicated.

EXAMPLE I

Two sheets and a strip one inch wide of a calendered flexible material having a thickness of about 60 mils were prepared having the following composition and labeled as a first sheet, a second sheet and a flexible strip.

| Compound | Parts |
| --- | --- |
| Butadiene-acrylonitrile copolymer (1) | 100 |
| Zinc oxide | 5 |
| Sulfur | 1.5 |
| Magnesium carbonate | 2.25 |
| Carbon black (fine thermal furnace and HAF) | 112 |
| Dioctyl phthalate | 17 |
| Aryl-p-phenylene diamines | 0.5 |
| Polyvinyl chloride resin (2) | 43 |
| Adipic acid ester plasticizer (3) | 35 |
| Accelerator - mixture of a benzothiazole sulfonamide and a benzothiazole disulfide | 1.75 |
| | 318.0 |

1 obtained as Chemigum N-7 from The Goodyear Tire & Rubber Company;
2 obtained as Pliovic AO-3 from The Goodyear Tire & Rubber Company; and
3 obtained as Adipal BCA from The F.M.C. Corporation.

To the first and second sheets was adhered a transparent thermoplastic film of nylon of the nylon-6 type made from a polymer of $\epsilon$-caprolatum having a thickness of about 1 mil (obtained as Capran from The Allied Chemical Company) with a curable butadiene-acrylonitrile rubber adhesive labeled as rubber adhesive (A). The curable rubber adhesive had the following composition:

| Compound | Parts |
| --- | --- |
| Butadiene-acrylonitrile copolymer (4) | 72 |
| Zinc oxide | 3.5 |
| Sulfur | 1 |
| Carbon black (SRF) | 21 |
| Accelerator (a benzothiazole disulfide) | 0.5 |
| Phenolic Resin | 83.5 |
| Methyl ethyl ketone | 549 |
| Total | 730.5 |

4 obtained as Hycar 1001 from The B. F. Goodrich Company.

A metal mold was prepared and divided into substantially identical first and second concave halves which were identified as a first concave mold and a second concave mold.

Figure 4:
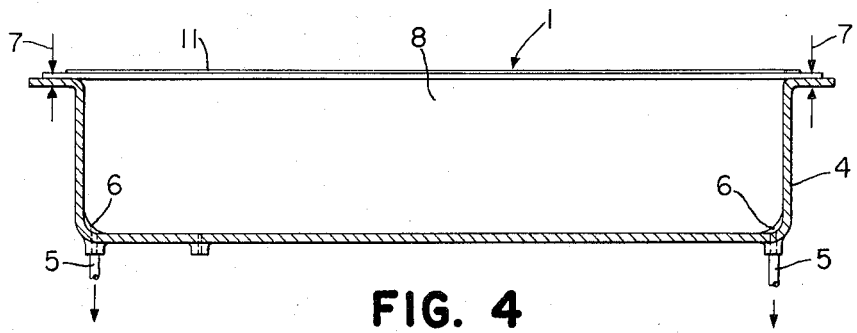
FIG. 4 is a cross-sectional view of a first concave mold having a first sheet of flexible material releasably attached or clamped over its aperture.
Figure 5:
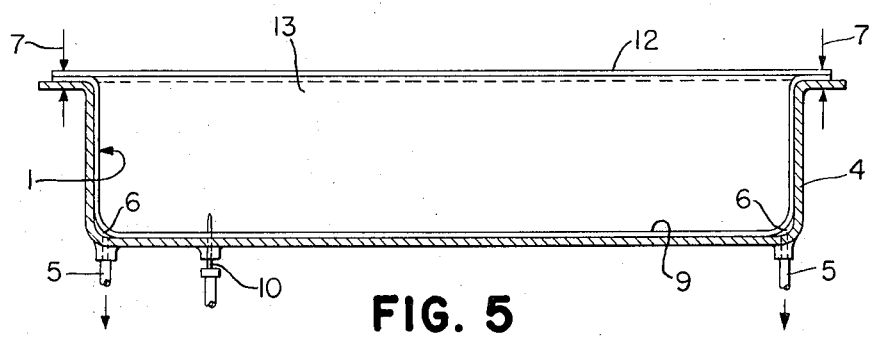
FIG. 5 is a cross-sectional view of the first concave mold having the first flexible sheet in a concave position on the concave surface of the mold and a second flexible sheet adhered over the aperture of first concave flexible sheet with a vent pipe attached to the formed cavity between the first and second sheets.
Figure 6:
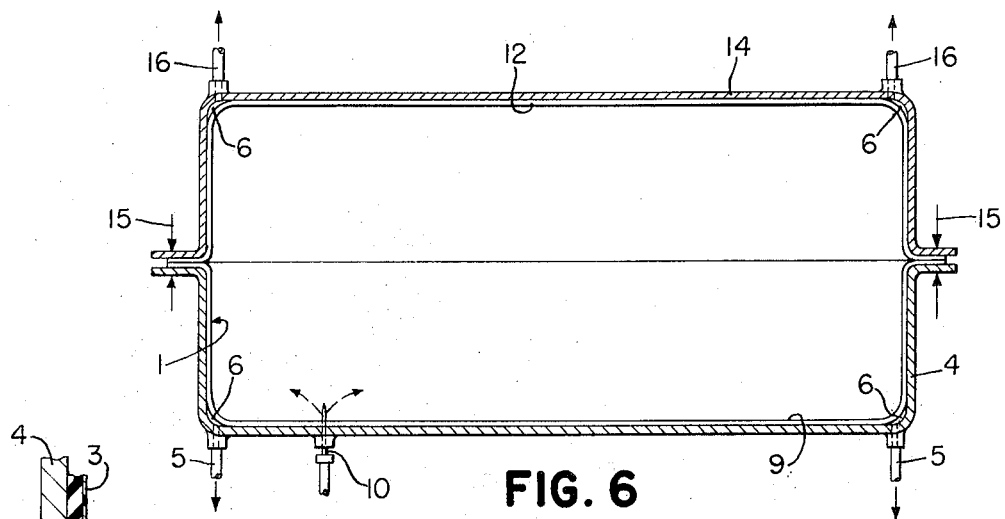
FIG. 6 is a cross-sectional view of the first concave mold, the first sheet positioned on the concave surface of the first mold, a second concave mold positioned and releasably attached by clamping over the second sheet, and the second sheet in a concave position on the surface of the second concave mold.
Figure 7:
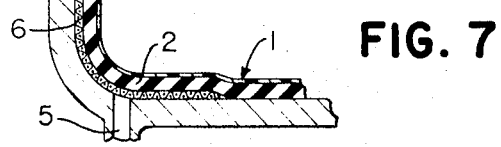
FIG. 7 is an enlarged cross-sectional view of a corner of the concave mold having a fibrous pad such as a textile fabric positioned over the opening of a vent tube attached to the corner of the mold.

The first and second concave molds were 5 ½ inches deep and their rectangular apertures measured 40 inches by 15 inches and were fitted with venting tubes in the manner shown in FIGS. 4, 5 and 6. These venting tubes were connected to a reduced pressure or vacuum source. The openings of these venting tubes on the inside surface of the molds were covered with loosely woven cotton textile cloth in the manner shown in FIG. 7.

The first flexible sheet was then positioned and clamped over the aperture of the first concave mold to form a first cavity between the first sheet and surface of the first mold in the manner shown in FIG. 4. The first flexible sheet and mold were heated to about 70°C. by blowing hot air on them to facilitate increasing the flexibility of the said flexible sheet. A vacuum was applied to the first cavity through its venting tubes thereby pulling the first flexible sheet into the first mold cavity against the mold surface and shaping the first sheet to a concave configuration.

A vent tube was then tightly positioned through the first mold and through the first sheet by puncturing the first sheet. The tight positioning of this vent tube through the first mold and first sheet maintained the reduced pressure or vacuum between the first mold and first sheet, thereby maintaining the concave configuration of the first sheet.

A thin layer of the curable rubber adhesive (A) was coated onto the first sheet around the portion of the first sheet positioned over the periphery of the aperture of the concave mold. The bottom surface of the prepared one inch wide flexible strip having a thickness of 60 mils was adhered to the adhesive composition coating around the aperture. To the top surface of the flexible strip was applied a thin coating of the curable rubber adhesive (A). Over this adhesive coating was then adhered the second flexible sheet in the manner shown in FIG. 5 to form a second cavity between the two flexible sheets vented by the vent tube inserted through the first mold and the first flexible sheet. The first and second flexible sheets were positioned so that their surfaces having the hydrocarbon barrier adhered thereto were facing each other.

Over the second sheet was positioned and clamped the second mold substantially over the aperture of the first mold in the manner shown in FIG. 6 to form a third cavity between the second sheet and second mold. The first and second molds with the first and second sheets attached therein were heated to about 70°C. in a hot air oven to to increase the flexibility of the said sheets and then removed from the oven.

A reduced pressure of vacuum was applied to the third cavity through its venting tubes, thereby pulling the second flexible sheet against the second mold surface and shaping the second sheet. A pressure differential between the second mold surface (third cavity) and outer surface of the second sheet having the hydrocarbon barrier adhered thereto (second cavity) was provided by allowing the vent tube to the second cavity between the first and second sheets to vent outside air into the second cavity as the reduced pressure or vacuum was being applied to the third cavity.

The attached first and second mold halves with the shaped first and second flexible sheets therein were placed in a hot air oven at a temperature of about 120°C. for about 1 ½ hours to cure the flexible sheets, the flexible strip and curable rubber adhesive (A) to form a shaped composite structure.

The composite structure was removed from the mold, filled with gasoline and determined to be leak-free.

The composite structure of this example was prepared by shaping flexible sheets through the application of a pressure differential by applying a reduced pressure in the first and third cavities. It is understood that the pressure differential can also be applied by applying a positive pressure to the second cavity.

In the method of this invention, for strengthening and barrier purposes, the flexible sheets can contain fibrous materials either of the nonwoven type or of the extensible woven type. Various fibers can be used such as nylon, cotton and cellulose derivatives such as rayon.

As shown by the example, when the flexible sheets are used with hydrocarbon barrier layers adhered to the surfaces of the sheets facing each other, it is preferred that a layer of a curable composition is interposed between the said sheets and adhered to the hydrocarbon barrier layers at their seamline prior to curing the sheets. The purpose of this layer is to enhance the bond strength between the hydrocarbon barrier layer. Various materials and compositions can be used for this layer. Representative examples are the flexible

What is claimed is:

1. A method of preparing a pinched seam container suitable for containing liquid hydrocarbons comprised of shaped cured polymeric flexible sheets with flexible hydrocarbon barrier layers adhered together through a cured flexible strip around their periphery which comprises a. releasably attaching a first sheet comprising a flexible curable polymeric material adhered to a layer of a flexible polymeric hydrocarbon barrier material over the aperature of a first concave mold to form a first enclosed cavity between the sheet and the mold with the layer of hydrocarbon barrier material facing away from the mold, b. applying reduced fluid pressure to said first enclosed cavity to actuate and shape the first sheet against the first concave mold, c. providing a vent through the wall of the first shaped sheet extending through the wall of the first concave mold, d. adhesively adhering a similar second flexible sheet to the said first sheet with a curable adhesive through a strip of curable flexible polymeric material around their peripheries to form a second cavity between the said sheets where the sheets have their hydrocarbon barrier layers facing each other, e. releasably attaching a second concave mold to the second sheet such that a third cavity is formed between the second sheet and concave mold and such that the second mold is positioned substantially over the aperature of the first mold, f. applying reduced fluid pressure to the third cavity to actuate and shape the second sheet against the second concave mold, g. curing the curable polymeric material of the first and second sheets in this position, the adhesive, and the strip of curable polymeric material to form a composite structure and h. removing the said composite structure from the first and second molds.

2. A method according to claim 1 where the flexible sheet and strip comprises rubbery material individually selected from the group consisting of natural rubber, rubbery 1,4 addition polymers of 1,3-butadiene, rubbery 1,4 addition polymers of isoprene, rubbery copolymers of butadiene and styrene, rubbery copolymers of butadiene and acrylonitrile, butyl rubber, rubbery copolymers of ethylene and propylene, terpolymers of ethylene, propylene and a minor proportion of a nonconjugated diene, and polymers formed by the open ring polymerization of unsaturated alicyclic compounds having from one through three carbon-to-carbon double bonds in the alicyclic ring.

3. A method according to claim 2 wherein the flexible sheet and strip comprise a rubbery copolymer of 1,3 butadiene and acrylonitrile in admixture with from about 10 to about 60 parts of polyvinyl chloride per 100 parts by weight of the said rubbery copolymer.

4. A method of preparing a pinched seam container suitable for containing liquid hydrocarbons comprised of shaped cured polymeric flexible sheets with flexible hydrocarbon barrier layers adhered together through a cured flexible strip around their periphery which comprises a. releasably attaching first and second curable polymeric flexible sheets over the apertures of first and second concave molds, correspondingly, the dimensions of the mold apertures being substantially the same, to form enclosed cavities between the curable polymeric flexible sheets and respective molds, wherein the said polymeric flexible sheets each comprise a curable rubber adhered to a layer of a flexible polymeric hydrocarbon barrier material with the said layer of hydrocarbon barrier material of the sheets facing outwardly from their said respective concave molds, where the said barrier layers have a thickness of from about 0.25 to about 10 mils and are selected from at least one of the group consisting of nylon, polyvinylidene chloride, copolymers of vinylidene chloride, vinyl chloride and acrylonitrile, and linear polyesters of the structure derived from straight chain glycols having from two to ten carbon atoms and at least one dicarboxylic acid selected from terephthalic acid and isophthalic acid, b. applying reduced fluid pressure to one of the said cavities to actuate and shape the first of the said flexible sheets against its respective concave mold, c. providing at least one vent to outside air through the wall of said shaped flexible sheet extending through the corresponding mold wall, d. adhesively adhering the first and second flexible sheets through a strip of curable rubber interposed between the said sheets at about their peripheries and adhered with adhesive to the said layers of hydrocarbon barrier material to define an enclosed cavity therebetween vented with the said vent, and to provide a pinched seam around the periphery of the sheets, e. shaping any of the said flexible sheets remaining unshaped against its respective concave mold by applying reduced fluid pressure to its corresponding enclosed cavity, f. curing, in this position while maintaining said reduced pressure, the said curable polymeric material of the said flexible sheets and the said strip of curable polymeric material to form a composite structure, said vent being operable to maintain a pressure differential across said shaped sheets while curing, and g. removing the said composite structure from the first and second molds.

5. A method according to claim 4 where the curable rubber for the flexible sheet and strip comprises rubbery materials individually selected from the group consisting of natural rubber, rubbery 1,4 addition polymers of 1,3 butadiene, rubbery 1,4 addition polymers of isoprene, rubbery copolymers of butadiene and styrene, rubbery copolymers of butadiene and acrylonitrile, butyl rubber, rubbery copolymers of ethylene and propylene, terpolymers of ethylene, propylene and a minor proportion of a nonconjugated diene, and polymers formed by the open ring polymerization of unsaturated alicyclic compounds having from one through three carbon-to-carbon double bonds in the alicyclic ring.

6. A method according to claim 5 where the hydrocarbon barrier layer is selected from the group consisting of nylon, polyvinylidene chloride, polymers comprising from about 50 to about 100 mol percent units derived from vinylidene chloride, from about 0 to about 50 mol percent units derived from vinyl chloride and from 0 to 50 mol percent units derived from acrylonitrile, and a polymeric linear ester comprising a polymeric polyester of substantially the structure derived from the reaction of at least one dicarboxylic acid selected from the group consisting of terephthalic acid and isophahalic acid with at least one straight chain glycol of the series $(HO(CH_2)_nOH$, where "$n$" is an integer from 2 to 10 inclusive, and where the ratio of units of the polymer derived from terephthalic acid to the units derived from isophthalic acid is from about 20:80 to 100:0.

7. A method according to claim 6 wherein the flexible sheet and strip comprise a rubbery copolymer of 1,3 butadiene and acrylonitrile in admixture with from about 10 to about 60 parts of polyvinyl chloride per 100 parts by weight of the said rubbery copolymer.

8. A method according to claim 4 wherein the flexible sheets comprise a curable rubbery copolymer of 1,3-butadiene and acrylonitrile in admixture with from about 10 to about 60 parts of polyvinyl chloride per 100 parts by weight of the said copolymer where the hydrocarbon barrier layers are comprised of nylon derived from $\epsilon$-caprolatum having a thickness of from about 0.25 mils to about 10 mils, where the said sheets having the said hydrocarbon barrier layers adhered thereto are heated prior to their shaping to enhance their flexibility and where an adherent layer of a curable composition comprising a rubbery copolymer of 1,3-butadiene and acrylonitrile in admixture with polyvinyl chloride is interposed between the said sheets to the hydrocarbon barrier layers at their seam line prior to curing the sheets.

* * * * *